3,449,036
Patented June 10, 1969

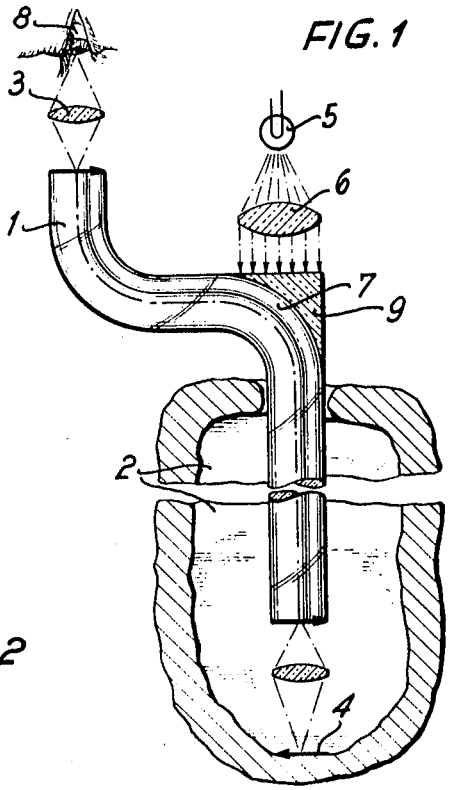
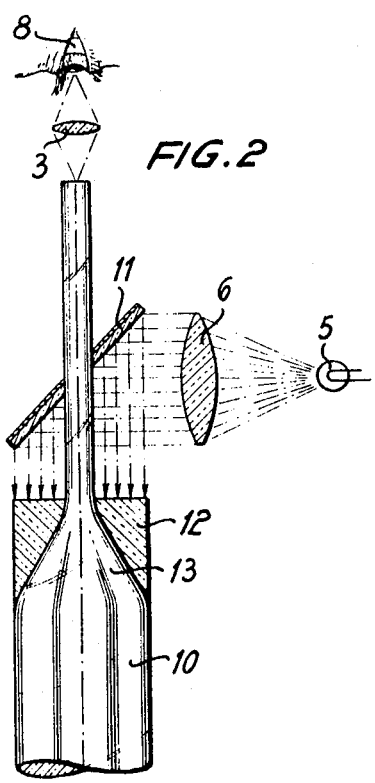

3,449,036
ATTACHMENT FOR INTRODUCING LIGHT INTO AN IMAGE TRANSMITTING FIBER-OPTICAL SYSTEM FOR ILLUMINATING AN OBJECT
Alfred Jacobsen, Mainz, Germany, assignor to JENAer Glaswerk Schott & Gen., Mainz, Germany, a corporation of Germany
Filed Jan. 11, 1966, Ser. No. 519,848
Int. Cl. G02 5/16
U.S. Cl. 350—96                                            4 Claims

ABSTRACT OF THE DISCLOSURE

Light rays are introduced laterally into and between the ends of an image transmitting fiber-optical system composed of a bundle of light conducting fibers. This bundle of light conducting fibers This bundle of light conducting fibers is formed between its ends with a right-angle bend or with a conical enlargement and the light rays are introduced at this bend or at the conical enlargement. The light rays are reflected toward that end of the bundle of fibers where an object to be illuminated is arranged whose image is to be transmitted to the other end of said bundle of light conducting fibers for viewing.

---

The invention relates to a method of introducing light into an image transmitting fiber-optical system for the purpose of illuminating an object.

A fiber-optical system consisting of a bundle of parallel disposed optically insulated fibers of glass or other transparent material is capable of transmitting images from one end of said system to the other. At the end where the ocular is located is produced an undistorted raster image of the object. The resolving power of said raster image is determined by the degree of fineness of the raster or by the size of the fiber diameter, respectively.

For viewing items in dark hollow spaces, two adjacently positioned fiber-optical systems are generally used. One of these systems introduces light for the illumination and the other system conducts the image to the ocular. If it is desired to economize on space, one and the same fiber-optical system is used for both illumination and observation of the object. The difficulty herein resides in finding a suitable way to admit light at the side where the ocular is located. For this purpose may be used, for instance, a semi-transparent mirror included to the optical axis by less than 45°; by means of this mirror the light is admitted from the side and the image of the object is viewed through this mirror on the fiber bundle entrance surface.

In such an arrangement, however, a part of the introduced light is always reflected on the entrance surface of the fiber-optical system so that the observer is blinded which results in a reduced perception of contrasts during the observation.

Each light conducting fiber in the bundle of fibers comprising a fiber optical system consists of a thin thread of a transpartent material, e.g. glass, having a high index of refraction, and is surrounded by or imbedded in another transparent material, e.g. glass, having a low index of refraction. Owing to the difference of the two indices of refraction at the boundary surface between the two media a total reflection takes place under predetermined conditions so that the light remains in the optically denser medium, namely in the fiber core. In elongated cylindrical fibers the light, once inclosed, is reflected in zagzag from wall to wall and is conducted by the fiber to the other end where it can be discharged. In strongly bent fibers it may happen that a part of the conducted light leaves the system at the bend because the critical angle at which a total reflection may occur, has become too small.

It is the object of the invention to provide a method for introducing light into an image transmitting fiber optical system for the purpose of illuminating an object, in which method the light introduction of the object takes place at those places of the system at which the light conducting fibers exhibit changes in direction.

The invention is based on the fact that the path of the light rays is in general reversible by means of some optical system, and in a corresponding fashion it is possible to admit light through the outer layer of an optically insulated fiber, for instance at a bend of a fiber optical system, without causing a blinding of the observer.

According to the invention, the light may be introduced into the fiber optical system from the side at a bend of the system or it may be reflected into the thin end of a conical part of the system.

According to a further object of the invention, those places of the system at which the light is introduced, are provided with an attachment piece which is made of a transpartent material, preferably glass or plastics, having the same index of refraction as the glass of the fiber cladding and which is in optical contact with the system.

This ensures that the incoming light impinges perpendicularly and proceeds unrefracted to the core of the light conducting fiber where it is confined.

The drawing illustrates diagrammatically two constructional examples of devices for carrying out the method according to the invention.

In the drawings:

FIG. 1 is a side elevation view of a bent fiber bundle extending into a cavity, and FIG. 2 is a side elevation view of a conical fiber bundle device according to the invention.

Referring to FIG. 1, the bent fiber bundle 1 comprising a plurality of fibers is inserted into a cavity into a cavity 2, for instance a body cavity. Above the upper end of the fiber bundle 1 is arranged an ocular 3.

For the purpose of illuminating the object 4 or any other portion in the cavity 2 is used a light source 5 arranged outside the cavity so that the light rays are introduced by means of a collective lens 6 into the fiber bundle 1 at a substantially right-angled bend 7 of it. The light rays are concentrated upon the object 4 without causing a blinding of the eye 8 of the observer.

In accordance with the present invention, the outside of the bend 7 has secured thereto an attachment piece 9 of glass or plastics of substantially the shape of a rectangular prism, whereby a material is selected which has the same index of refraction as the glass of the mantle of the fibers in the bundle 1.

The device of FIG. 2 differs from that of FIG. 1 in that not a bent fiber bundle is used, but a bundle 10 having a conical portion 13 between its ends. The light rays coming from a laterally disposed light source 5 are introduced by means of the collective lens 6 and a mirror 11 into the conical portion 13 of the bundle 10. The mirror 11 reflects the light rays to the plane surface of the attachment piece 12 which surrounds the thin end of the conical portion 13 of the fiber bundle 10. The observer's eye 8 observes the image appearing at the upper flat end face of the thin portion of the bundle 10 through an ocular 3 in the same manner as in the device of FIG. 1.

In accordance with the invention it is possible for the purpose of increasing the amount of light which illuminates an object to arrange a number of places suitable for admitting light one after the other, in that for example a fiber optical system is bent several times at sharp angles and the light is then introduced at these bends. Although a portion of the light passing to the ocular is being lost at each bend, the illumination light can be brought up in each individual case to its optimum by providing a sufficient number of bends in the fiber optical system.

What I claim is:

1. A transparent attachment for introducing light rays into an image transmitting fiber-optical system for the purpose of illuminating an object disposed at one end of said system and viewing an image of said illuminated object appearing at the other end of said system, said system being composed of a bundle of light conducting fibers consisting of a transparent material and in which each fiber is encased in a mantle of another transparent material, the material of said fibers having a higher index of refraction than the material forming the mantle of said fibers, the fibers in said bundle changing their lengthwise directions between the ends of said bundle, said attachment comprising an element which has the same refraction index as the material of said mantle, said element being secured to the bundle at the change of the lengthwise direction position in optical contact with the mantle material for the purpose of introducing light rays directly into the fibers of said bundle in the direction of said object at those places where the fibers in said bundle change their lengthwise direction.

2. A fiber-optical system according to claim 1, in which said attachment piece has a light admitting surface which is perpendicular to the incident light rays.

3. A fiber-optical system according to claim 1, in which said bundle of light conducting fibers is provided between its ends with a substantially right-angled bend and the light rays are introduced from the exterior of said bundle into said bend in a direction parallel to a straight portion adjacent said bend which leads to the object to be illuminated.

4. A fiber-optical system according to claim 1, in which the change of direction of said bundle of light conducting fibers is provided between its ends by a conical enlargement merging a thin portion of said bundle of fibers into an enlarged portion facing the object to be illuminated, and that the light rays are introduced into said fiber-optical system by being reflected from a point adjacent said thin portion of said bundle of fibers parallel thereto into said enlarged conical portion of said bundle of fibers in a direction toward said object.

References Cited

UNITED STATES PATENTS 2,385,367  9/1945  Meister.
3,060,806  10/1962  Lewis et al. _____ 350—96 X

OTHER REFERENCES

Dersh: "Optical Switching Using Light Pipes," IBM Technical Disclosure Bulletin, vol. 5, No. 8, January 1963, pp. 97 and 98.

JOHN K. CORBIN, *Primary Examiner.*

U.S Cl. X.R.

240—1